Nov. 26, 1963
I. E. BRYANT
3,111,766
THREAD DIAMETER MEASURING DEVICE
Filed April 10, 1961
2 Sheets-Sheet 1
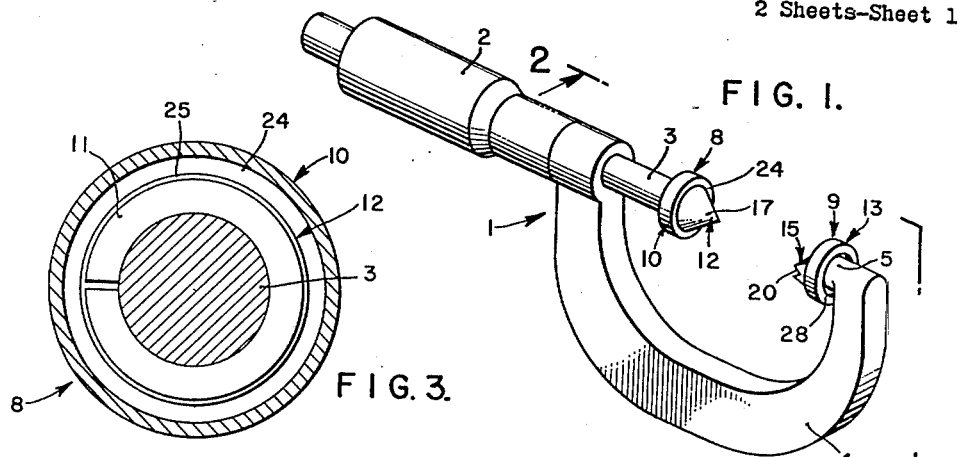
FIG. 1.
FIG. 3.
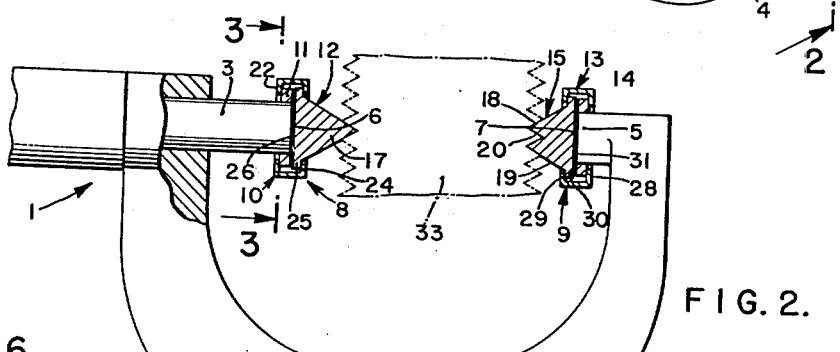
FIG. 2.
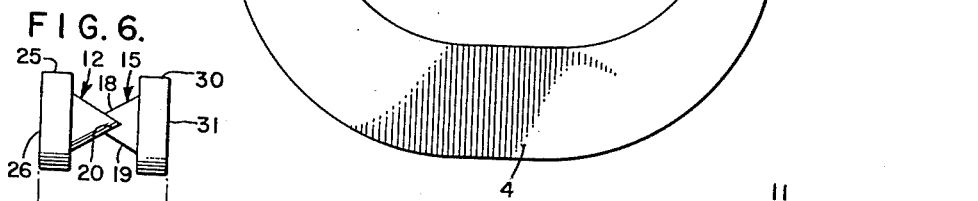
FIG. 6.
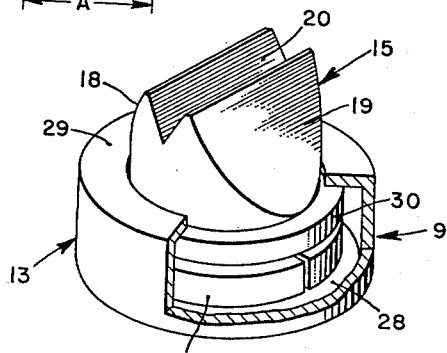
FIG. 4.
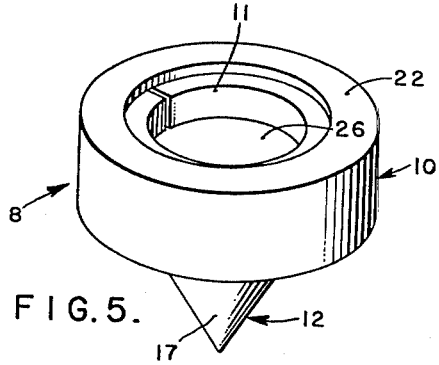
FIG. 5.
INVENTOR.
IRVIN E. BRYANT
BY 
ATTORNEY.

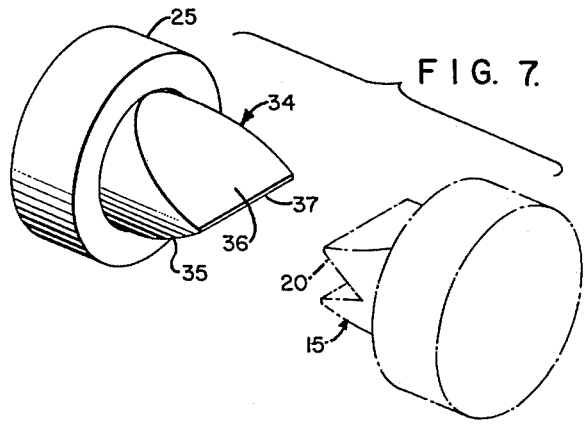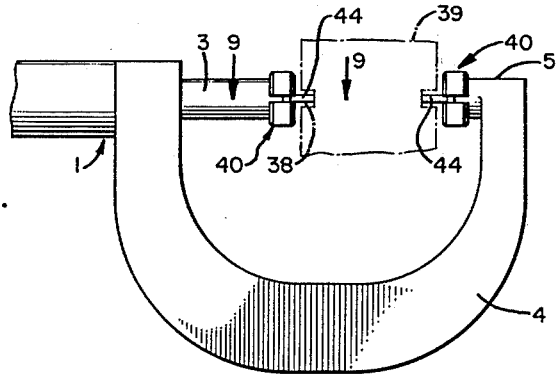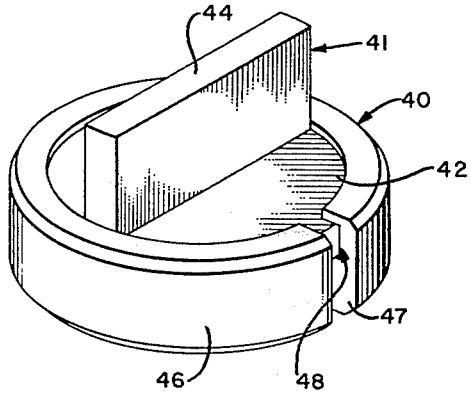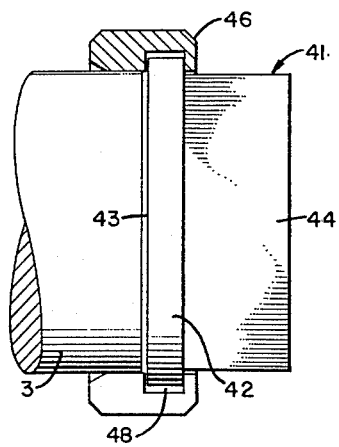

United States Patent Office 3,111,766
Patented Nov. 26, 1963

3,111,766
THREAD DIAMETER MEASURING DEVICE
Irvin E. Bryant, Hawthorne, Calif., assignor to The Lufkin Rule Company, Saginaw, Mich., a corporation of Michigan
Filed Apr. 10, 1961, Ser. No. 105,850
3 Claims. (Cl. 33—167)

This application is a continuation in part of my copending application serial No. 88,705, filed February 13, 1961, now abandoned, for Thread Diameter Measuring Device.

This invention pertains to an arrangement for obtaining a precision dimension of the pitch diameter of screw threads.

The measurement of screw thread pitch diameter has in the past required the use of special, high cost, precision measuring instruments. Each such instrument is limited in capacity both from the standpoint of diameters to be measured and the pitch of the threads. Therefore, to have anything like a complete set for measurement of a variety of threaded articles, many hundreds of dollars worth of special measuring instruments have been necessary. This is coupled with the inconvenience and time lost in utilizing many different instruments in accomplishing the measurements.

According to the provisions of this invention, a simple, low cost unit is provided that can be associated with a conventional micrometer. This is in the form of units removably connected to the spindle and anvil of the micrometer, each unit including a floating insert for engagement with the screw threads. Not only is this arrangement more economical than conventional thread measuring devices, but it is limited in capacity only by the size of the micrometer.

Accordingly, it is an object of this invention to provide a low cost, yet reliable and accurate arrangement for obtaining thread diameter measurements.

Another object of this invention is to provide a thread diameter measuring device usable with conventional micrometers.

A further object of this invention is to provide a thread diameter measuring device obviating the use of a large number of special measuring instruments.

These and other objects will become apparent from the following detailed description taken in connection with the accompanying drawing in which:

FIG. 1 is a perspective view of the arrangement of this invention,

FIG. 2 is a longitudinal sectional view of the invention taken along line 2—2 of FIG. 1, FIG. 3 is a sectional view of one of the adapter assemblies taken along line 3—3 of FIG. 2, FIG. 4 is a perspective view taken from the top, and partially broken away, of one of the removable thread engaging assemblies, FIG. 5 is a perspective view taken from the bottom of the other thread engaging assembly, FIG. 6 is an elevational view of the two inserts in engagement showing the dimension to be subtracted in obtaining the correct pitch diameter measurement on the micrometer.

FIG. 7 is a perspective view illustrating a modified form of thread insert,

FIG. 8 is a side elevational view of the invention as used with a micrometer in measuring groove dimensions, FIG. 9 is an enlarged fragmentary sectional view taken along line 9—9 of FIG. 8, and FIG. 10 is a perspective view of the adapter for measuring groove dimensions.

As illustrated in FIGS. 1, 2 and 3 of the drawing, the device of this invention is utilized in connection with a conventional micrometer 1 that includes a rotatable sleeve 2 for imparting axial movement to a spindle 3, and includes a suitable scale for denoting the precise position of the spindle. A yoke 4 carries the anvil 5 at its outer end, which is of the same diameter of the spindle and axially aligned therewith. In conventional measuring procedures, the measurement is taken by engaging the part with the radial faces 6 and 7 of the spindle and anvil.

According to the provisions of this invention, thread engaging assemblies 8 and 9 are provided which are removably connected to the spindle and anvil, respectively. It is immaterial which unit engages the spindle and which the anvil, because they are interchangeable in this respect. The unit 8 includes a retainer housing 10 which is held to the spindle by means of a split ring 11 and floatingly carries an insert 12, the outer end of which is adapted to engage a screw thread. The other adapter unit 9 includes a retainer 13 and split ring 14 which may be identical to the elements 10 and 11. Insert 15 is floatingly carried within the retainer and adapted also to engage the screw thread. The member 12 includes a conical projection 17 the outer end of which is adapted to fit within the groove of a screw thread, as illustrated in FIG. 2. The other insert 15 is generally cylindrical in form, but includes convergent outer faces 18 and 19 and a transversely extending groove 20 bisecting the axis at the outer end. The groove 20 is adapted to receive the projection of a screw thread, as may be seen in FIG. 2.

The retainer housing 10 of the unit 8 is provided with inwardly directed flange 22 at its outer end that extends inwardly a sufficient distance to retain the split ring 11 in place, regardless of whether the unit 8 is associated with the micrometer spindle 3 or removed therefrom. Installation of the unit 8 is accomplished simply by slipping the unit over the end of the anvil to the position of FIG. 2 where the split ring 11 grips the end of the spindle and retains the unit in place. This occurs because the split ring has a free diameter slightly less than that of the spindle so that when forced over the end of the spindle, it exerts an inwardly directed gripping force.

On the opposite side of the housing 10 is an additional inwardly directed flange 24 that serves to retain the flange 25 of the insert 12. The latter flange is concentric with the conical projection 17 and forms an extension of radial base surface 26 of the member 12. A clearance is provided between the inner edge of flange 24 and the surface of projecting element 17 of the insert 12.

The construction for the other insert 15 is in all respects similar. Thus, the housing 13 includes a flange 28 that retains split ring 14 which grips the anvil 5 of the micrometer. An additional flange 29 retains the base flange 30 of the insert 15 so that the flat radial surface 31 of the insert is adjacent the radial face 7 of the anvil. Clearance between the flange 29 and the insert 15 allows the latter member to float, as well as being retained with freedom for rotation.

As a result of this design, it is a simple matter merely to slip the two thread measuring units 8 and 9 over the spindle and anvil of any micrometer. When a threaded member 33 is positioned between the two units, the tip of conical projection 17 is received between adjacent threads, while the groove 20 of the member 15 receives the thread on the opposite side. The floating and rotation permitted members 12 and 15 permits this engagement to be made under all circumstances. The micrometer then is tightened against the work piece in the usual manner which assures that face 26 of member 12 contacts end wall 6 of the spindle, and that the surface 31 of member 15 is brought into contact with the radial face 7 of the anvil 5. The micrometer then is read to give an indication of the pitch diameter of the threaded member 33.

Of course it is necessary to deduct the dimension added by the inclusion of the adapters 8 and 9 in arriving at the true figure for the pitch diameter. This dimension is the distance between the faces 26 and 31 of the inserts when the tip of member 17 is received within the groove 20. This is indicated as distance A in FIG. 6. In a typical example, this may be 0.2000 inch. Of course, if this value is unknown, it is a simple matter to close the micrometer to interengage the inserts in this manner and the reading then indicated by the micrometer is the figure to be deducted when establishing pitch diameter.

From the foregoing, it is apparent that I have provided a simplified pitch diameter measuring arrangement allowing a conventional micrometer to be utilized in giving an accurate determination of a threaded part. The device will accommodate any diameter of threaded part commensurate with the size of the micrometer selected, while the adapters may be slid on and off the micrometer spindle and anvil in a matter of moments.

From a production standpoint the tapering insert 34 seen in FIG. 7 offers advantages over the conical insert 12. The insert 34 may be identical with insert 12 insofar as its internal flange and radial face are concerened. Instead of a conical projection, however, the outer portion of the element 34 may be formed from a cylindrical member provided with flat tapering surfaces 35 and 36 that join at a radially extending edge 37 that intersects the axis of the element 34. The edge 37 is parallel to the inner face of the insert so that when received on the spindle or anvil of the micrometer, the edge 37 is parallel to the end surface of the micrometer element.

The wedge-like part thus formed is adapted to fit within the groove of a threaded part in a similar manner as the tip end of projection 17 of the previously described embodiment. Of course the outer edge also will fit within the groove 20 of the other insert 15 if these two members are brought together, similarly to the manner in which the parts are mated in FIG. 6. In other words, with the wedge-shaped insert, the measuring process is the same as in the previously described embodiment. However, the insert 34 is considerably easier to manufacture than the conical element 12. Where a normal production installation can produce two hundred per hour of the conical inserts, the wedge-shaped inserts can be manufactured at the rate of twelve hundred per hour. An additional advantage for the wedge-shaped unit lies in the fact that the outer edge gives greater wear resistance than the sharp point of the conical insert.

The teachings of this invention may be employed to advantage in obtaining the measurement of grooves or the like in accordance with the arrangement illustrated in FIGS. 8, 9 and 10. It may be necessary, for example to obtain an exact reading of the diameter of a relatively narrow groove 38 in a part 39. Such a groove, of course, is too small for receiving the spindle and anvil of a conventional micrometer, so that determination of the groove diameter has necessitated expensive special instruments or the use of inaccurate makeshift equipment. However, the arrangement of this invention may be utilized to quickly obtain such a dimension by the use of a conventional micrometer. This result is realized through the use of adapters 40 which are associated with the spindle and anvil of the micrometer. The adapter 40 includes a floating insert 41 which is provided with a base flange 42 having a radial face 43. A blade 44, having a radial outer edge 45, projects axially away from the base flange 42. The ends of these blades are receivable within the groove 38 so that an indication of the groove dimension may be obtained simply from the reading on the micrometer. Of course it is necessary to subtract twice the distance between face 43 and the end surface 45 of the blade in order to obtain the actual groove diameter. The use of the floating blade inserts, therefore, permits the device to measure groove dimensions in a manner heretofore impossible. It also may be used where there are recesses in one side of the part or both, and the adapters 40 may be used in combination, as illustrated in FIG. 8, or singly to fit the particular need.

The inserts 41 may be retained to the micrometer spindle or anvil by means of a housing 10 and split ring 11, as in the previously described embodiment. The housing 46 of FIGS. 8, 9 and 10, however, simplifies construction somewhat by omitting the necessity for a split ring. This is accomplished by making the housing itself of split construction having a gap 47 in its periphery. The housing 46 has a certain resilience and in its free position is of smaller diameter than that of the micrometer spindle or anvil. Therefore, the housing 46 may be secured to the anvil or spindle simply by slipping it over the end of the micrometer element causing it to grip the micrometer so that it is retained in place. Of course as the unit is shoved into place and the item is used, the radial face 43 of the base flange 42 of the insert 41 will be brought into engagement with the end surface of the spindle or anvil. The insert 41 will be permitted to float relative to the housing 46 through the provision of the oversize annular recess 48. Assembly of the insert 41 into the housing 46 is accomplished merely by expanding the housing sufficiently to allow the flange 42 to be brought into the groove 48, after which release of the housing will hold the insert within this groove. Thus the modified housing construction is utilized essentially as in the previously described embodiment, differing chiefly in the provision of a split housing rather than the inclusion of a separate split annular ring. Of course, the split housing construction may be used for holding the floating thread measuring inserts and as well as the inserts 41 for groove measurement.

The foregoing detailed description is to be clearly understood as given by way of illustration and example only, the spirit and scope of this invention being limited solely by the appended claims.

I claim:

1. In combination with a measuring device such as a micrometer having a spindle and anvil; a tubular, substantially cylindrical, relatively thin walled, resilient housing split from one end to the other end and having an opening normally slightly less in diameter than the diameter of one of said spindle and anvil; the housing having side edges spaced apart to provide a gap therebetween of a size to permit expansion of the housing to fit axially over the said one of the spindle and anvil of the measuring device; an insert having a flat circular base received within said housing and having an axially outwardly projecting member of decreased size relative to said base shaped at its outer end to be received by the member to be measured; the housing being formed with a continuous, internal peripheral groove receiving said base of a diameter slightly greater than the diameter of said base, and the internal size of the outwardly projecting portion of the insert being such, relative to the housing, that a lateral clearance is provided permitting a lateral "float" of said insert in said groove; said groove in the housing being annular and said outwardly projecting portion of the insert being of such size relative to the housing opening as to permit full rotation of said insert in said housing through substantially 360° in both directions of rotation simultaneously with lateral "float" of said insert.

2. The combination defined in claim 1 in which said base is of less thickness than the width of said groove in said housing to provide axial "float" for said insert in said housing.

3. In combination with a measuring device such as a micrometer having a rotatable spindle and an opposite anvil or the like; a substantially cylindrical housing having an opening from one end to the other slightly greater in diameter than the diameter of one of said spindle and anvil; an insert having a flat circular base received within said opening in said housing and having an axially outwardly projecting member of decreased size relative to said base shaped at its outer end to be received by the member to be measured; the housing having inner and outer radial end flanges forming a continuous, internal peripheral groove within said housing of a diameter slightly greater than the diameter of said base, and the internal size of the outwardly projecting portion of the insert being such, relative to the outer flange, that a lateral clearance is provided permitting a lateral "float" of said insert in said groove; said groove in the housing being annular and said outwardly projecting portion of the insert being of such size relative to the outer flange as to permit full rotation of said insert in said housing through substantially 360° in both directions of rotation simultaneously with lateral "float" of said insert; and a split ring in said housing axially inwardly of said base of an internal diameter slightly less than said one of said spindle and anvil expandable to fit axially over said one of said spindle and anvil and retain the housing thereon.

References Cited in the file of this patent
UNITED STATES PATENTS

| | | |
|---|---|---|
| 1,392,313 | Fallow | Oct. 4, 1921 |
| 1,921,899 | Webbeking | Aug. 8, 1933 |
| 2,410,571 | Easton et al. | Nov. 5, 1946 |
| 2,624,125 | Johnson | Jan. 6, 1953 |
| 2,826,822 | Noviant | Mar. 18, 1958 |
| 2,937,452 | Man | May 24, 1960 |